US009579806B2

(12) United States Patent
Sussman

(10) Patent No.: US 9,579,806 B2
(45) Date of Patent: Feb. 28, 2017

(54) ROBOTIC POWER AND SIGNAL DISTRIBUTION USING LAMINATED CABLE WITH SEPARATOR WEBS

(75) Inventor: Michael Sussman, Winchester, MA (US)

(73) Assignee: RETHINK ROBOTICS, INC., Boston, MA (US)

( * ) Notice: Subject to any disclaimer, the term of this patent is extended or adjusted under 35 U.S.C. 154(b) by 874 days.

(21) Appl. No.: 13/592,886

(22) Filed: Aug. 23, 2012

(65) Prior Publication Data

US 2014/0053676 A1 Feb. 27, 2014

(51) Int. Cl.
*H02G 11/00* (2006.01)
*B25J 19/00* (2006.01)

(52) U.S. Cl.
CPC ...... *B25J 19/0025* (2013.01); *Y10T 74/20311* (2015.01)

(58) Field of Classification Search
CPC .................. B25J 19/0025; Y10T 74/20311
USPC ............. 29/428, 868, 592.1, 828; 74/490.05, 74/490.02
See application file for complete search history.

(56) References Cited

U.S. PATENT DOCUMENTS

| | | | | |
|---|---|---|---|---|
| 2,751,565 A | * | 6/1956 | Johnston | H01R 39/00 191/12.2 R |
| 3,027,419 A | * | 3/1962 | Owen | H02G 3/26 174/146 |
| 3,145,934 A | * | 8/1964 | Guggemos | F21S 8/088 362/382 |
| 3,412,951 A | | 11/1968 | Ober | |
| 4,499,341 A | * | 2/1985 | Boyd | B65H 75/4449 191/12.4 |
| 4,545,555 A | | 10/1985 | Koch | |
| 4,577,085 A | * | 3/1986 | Burgher | B23K 11/362 219/116 |

(Continued)

FOREIGN PATENT DOCUMENTS

| | | |
|---|---|---|
| EP | 1741523 A3 | 12/2007 |
| JP | 1-101123 A | 4/1989 |

(Continued)

OTHER PUBLICATIONS

International Application Serial No. PCT/US2013/035706, International Search Report and Written Opinion mailed on Jul. 10, 2013, 10 pages.

*Primary Examiner* — Peter DungBa Vo
*Assistant Examiner* — Kaying Kue
(74) *Attorney, Agent, or Firm* — Morgan, Lewis & Bockius LLP

(57) ABSTRACT

Systems and methods that facilitate cables to pass through moving, space-constrained joints and conveying power and/or signals to various robotic joint-associated elements utilize a unitary and flat laminated cable slack within the joint to accommodate the relative motion between mechanical elements of the joints. In various embodiments, the cable has multiple insulated sub-cables; each sub-cable is insulated and physically separable from all other sub-cables. Some of the sub-cables are separated from the cable and electrically connected to joint-associated components for conveying signals and power thereto without mechanically interfering with relative motion between mechanical elements of the joint.

9 Claims, 5 Drawing Sheets

(56) References Cited

U.S. PATENT DOCUMENTS

| | | | |
|---|---|---|---|
| 4,710,593 A * | 12/1987 | Hall, Jr. | H01R 4/70 174/70 S |
| 4,793,203 A | 12/1988 | Staggl et al. | |
| 4,975,063 A | 12/1990 | Ida et al. | |
| 4,987,332 A * | 1/1991 | Yamamoto | B25J 15/0019 310/309 |
| 5,053,583 A | 10/1991 | Miller et al. | |
| 5,065,062 A * | 11/1991 | Uehara | B25J 19/0029 227/3 |
| 5,083,284 A * | 1/1992 | Kato | G01R 31/021 377/16 |
| 5,224,871 A | 7/1993 | Ida et al. | |
| 5,242,309 A | 9/1993 | Hasegawa | |
| 5,286,921 A * | 2/1994 | Fontaine | G01K 1/026 174/68.1 |
| 5,304,071 A | 4/1994 | Bannai et al. | |
| 5,339,866 A * | 8/1994 | Holt | B29C 65/02 138/106 |
| 5,382,172 A | 1/1995 | Klier et al. | |
| 5,669,269 A * | 9/1997 | Katamine | B25J 9/102 414/918 |
| 5,732,898 A | 3/1998 | Odessky et al. | |
| 5,794,487 A | 8/1998 | Solomon et al. | |
| 5,816,107 A * | 10/1998 | Takahashi | B25J 19/0029 414/918 |
| 5,863,010 A | 1/1999 | Boomgaarden | |
| 6,372,988 B1 | 4/2002 | Burke et al. | |
| 6,408,224 B1 * | 6/2002 | Okamoto | B25J 9/1661 29/721 |
| 6,417,445 B1 | 7/2002 | Sato et al. | |
| 6,438,842 B1 | 8/2002 | Raami | |
| 6,460,795 B1 | 10/2002 | Brown, Jr. | |
| 6,622,585 B1 * | 9/2003 | Salomonsson | B25J 19/0029 248/68.1 |
| 6,644,582 B1 | 11/2003 | Liao | |
| 6,682,287 B2 | 1/2004 | Glass et al. | |
| 6,795,750 B2 * | 9/2004 | Kullborg | B25J 17/0283 700/245 |
| 6,890,095 B2 * | 5/2005 | Gul | G01K 3/06 374/115 |
| 6,941,192 B2 | 9/2005 | Tang et al. | |
| 6,966,791 B1 | 11/2005 | Farr | |
| 7,100,861 B2 | 9/2006 | Glasson | |
| 7,147,062 B2 | 12/2006 | Kolacz et al. | |
| 7,175,453 B2 | 2/2007 | Yajima et al. | |
| 7,181,314 B2 | 2/2007 | Zhang et al. | |
| 7,209,801 B2 | 4/2007 | Anfindsen et al. | |
| 7,236,854 B2 | 6/2007 | Pretlove et al. | |
| 7,353,081 B2 | 4/2008 | Skourup et al. | |
| 7,353,082 B2 | 4/2008 | Pretlove et al. | |
| 7,372,230 B2 | 5/2008 | McKay | |
| 7,450,538 B2 | 11/2008 | Apneseth et al. | |
| 7,544,063 B2 | 6/2009 | Puskar et al. | |
| 7,563,130 B2 | 7/2009 | Farrar et al. | |
| 7,627,224 B1 | 12/2009 | Cassidy et al. | |
| 7,643,907 B2 | 1/2010 | Fuhlbrigge et al. | |
| 7,765,890 B2 | 8/2010 | Inoue et al. | |
| 7,806,019 B2 * | 10/2010 | Iwai | B25J 19/0025 414/918 |
| 7,826,984 B2 | 11/2010 | Sjostrand et al. | |
| 7,979,162 B2 | 7/2011 | Niemela et al. | |
| 8,022,655 B2 | 9/2011 | Endresen et al. | |
| 8,079,143 B2 | 12/2011 | Zhang et al. | |
| 8,090,475 B2 | 1/2012 | Blanc et al. | |
| 8,099,191 B2 | 1/2012 | Blanc et al. | |
| 8,118,147 B2 | 2/2012 | Ori et al. | |
| 8,121,729 B2 | 2/2012 | Blanc et al. | |
| 8,185,346 B2 | 5/2012 | Sjostrand et al. | |
| 8,190,294 B2 | 5/2012 | Sjostrand et al. | |
| 8,249,747 B2 | 8/2012 | Kock | |
| 2003/0060929 A1 * | 3/2003 | Kullborg | B25J 17/0283 700/245 |
| 2005/0085120 A1 * | 4/2005 | Carroll | H01R 13/582 439/425 |
| 2006/0048364 A1 | 3/2006 | Zhang et al. | |
| 2006/0049159 A1 * | 3/2006 | Nihei | B23K 9/1336 219/137.9 |
| 2006/0101936 A1 * | 5/2006 | Inoue | B25J 19/0029 74/490.01 |
| 2006/0178775 A1 | 8/2006 | Zhang et al. | |
| 2006/0262492 A1 * | 11/2006 | Tsai | G06F 1/266 361/601 |
| 2007/0106421 A1 | 5/2007 | Kamrani et al. | |
| 2007/0276538 A1 | 11/2007 | Kjellsson et al. | |
| 2008/0021440 A1 | 1/2008 | Solomon | |
| 2008/0028824 A1 | 2/2008 | Brogardh et al. | |
| 2008/0065257 A1 | 3/2008 | He et al. | |
| 2008/0091301 A1 | 4/2008 | Brantmark et al. | |
| 2008/0140321 A1 | 6/2008 | Blanc et al. | |
| 2008/0197710 A1 | 8/2008 | Kreitz et al. | |
| 2009/0114054 A1 * | 5/2009 | Horiuchi | B25J 9/102 74/490.05 |
| 2009/0126598 A1 * | 5/2009 | Takeda | B25J 9/026 105/148 |
| 2009/0204261 A1 | 8/2009 | Strand et al. | |
| 2009/0249915 A1 * | 10/2009 | Iwai | B25J 19/0025 74/490.02 |
| 2009/0281659 A1 | 11/2009 | Wappling et al. | |
| 2010/0036525 A1 | 2/2010 | Casanelles et al. | |
| 2010/0080524 A1 | 4/2010 | Ciechomski et al. | |
| 2010/0116078 A1 * | 5/2010 | Kim | B25J 17/0241 74/490.02 |
| 2010/0145509 A1 | 6/2010 | Zhang et al. | |
| 2010/0236046 A1 | 9/2010 | Lundberg et al. | |
| 2010/0241248 A1 | 9/2010 | Zhang et al. | |
| 2010/0307279 A1 * | 12/2010 | Campagna | B25J 15/04 74/490.05 |
| 2010/0312391 A1 | 12/2010 | Choi et al. | |
| 2010/0313694 A1 | 12/2010 | Aoki | |
| 2011/0045689 A1 * | 2/2011 | Tsai | G06F 1/18 439/490 |
| 2011/0095457 A1 | 4/2011 | Sirkett et al. | |
| 2011/0106141 A1 * | 5/2011 | Nakamura | A61B 34/71 606/205 |
| 2011/0132130 A1 * | 6/2011 | Liu | B25J 17/0283 74/490.05 |
| 2011/0154934 A1 * | 6/2011 | Skourup | B25J 19/0075 74/490.03 |
| 2012/0011956 A1 | 1/2012 | Lundberg | |
| 2012/0059516 A1 | 3/2012 | Lundberg et al. | |
| 2012/0067157 A1 * | 3/2012 | Suzuki | B25J 19/0025 74/490.02 |
| 2012/0255388 A1 * | 10/2012 | McClosky | B25J 19/0025 74/490.02 |
| 2013/0270399 A1 | 10/2013 | Berkowitz et al. | |

FOREIGN PATENT DOCUMENTS

| | | |
|---|---|---|
| JP | 03226917 A | 10/1991 |
| JP | 9-123083 A | 5/1997 |
| JP | 2002-307370 A | 10/2002 |
| JP | 2006202593 A | 8/2006 |
| WO | WO-2011153156 A2 | 12/2011 |
| WO | WO-2012004017 A1 | 1/2012 |
| WO | WO-2012004232 A2 | 1/2012 |
| WO | WO-2012010332 A1 | 1/2012 |
| WO | WO-2012027541 A1 | 3/2012 |
| WO | WO-2012031954 A1 | 3/2012 |

* cited by examiner

ROBOTIC POWER AND SIGNAL DISTRIBUTION USING LAMINATED CABLE WITH SEPARATOR WEBS

FIELD OF THE INVENTION

Embodiments of the present invention generally relate to cable management and, in particular, to managing cables that traverse moving robot joints.

BACKGROUND

A robotic arm generally requires complex cable systems to, for example, distribute power to multiple motor-actuated joints or convey signals detected by electro-mechanical sensors placed in various locations within the joints. Robotic arms that include distributed control and vision systems require additional wiring, such as Ethernet, USB, or RS-232, to link to control nodes for serial communications. The cable systems passing through robotic arms must be capable of accommodating joint movements and various mechanical displacements yet remain resistant to mechanical wear.

Conventionally, a large robotic arm is centrally controlled and large bundles of cables are routed externally to the joints. This approach may avoid the design difficulties of accommodating cables internally in the space-constrained package of the joints, but requires large cable loops with support structures to accommodate the motion of the robotic arm. Additionally, the externally bundled cables risk snagging the cable on an external object during joint movement.

Another cable-management strategy utilizes internalized cable wiring; this is sometimes used for smaller arms intended for use in proximity to human operators. Typically, slip rings are used in small, compact robots to link wiring between flexible joints. Alternatively, a highly flexible cable can be routed through the joints. The highly flexible cables, however, must be rated for millions of flex cycles before they experience mechanical wear; cable wear may result in increased electrical noise or intermittent connections. In addition, approaches employing either the slip rings or the highly flexible cable are expensive and thereby increase system cost.

In still another approach, bundles of torsion-rated cables are employed and passed through the center of a robot joint in order to minimize displacement of the cables during joint movement. This approach, however, requires creation of internal spaces within the joints for the cable flexure. Additionally, large holes through the central axis of each joint are typically necessary to accommodate passage of the bundled cables and/or facilitate connection to different elements inside the joints; this approach thus typically requires more space in the joint and/or special joint configurations, thereby increasing system complexity and cost.

Consequently, there is a need for an approach to cable management that provides for connection among various elements associated with the robot joints without the need for extra space or expensive support components, while avoiding cable wear.

SUMMARY

In various embodiments, the present invention relates to systems and methods for facilitating cable passage through moving, space-constrained joints and conveying power and/or signals to various robotic joint-associated elements. Compared with conventional cable-management approaches, the systems and methods disclosed herein allow cables to be more easily connected and disconnected from the joint-associated elements without mechanically interfering with the relative motion therebetween. In addition, embodiments of the present invention significantly reduce the space occupied by cables passing through robotic joints without subjecting the cables to possible damage or requiring custom support components. In a representative embodiment, a unitary and flat laminated cable is configured to be slack within the joint to accommodate the relative motion of the joint mechanical elements. The laminated cable typically includes multiple "sub-cables" that are attached to the cable and individually insulated, but which are also separable from the other sub-cables. In one implementation, some of the sub-cables are separated from the main laminated cable and electrically connected to joint-associated components that are located at various positions for conveying signals and power thereto. The separated sub-cables, which are individually insulated, provide extra degrees of freedom for the laminated cable to be flexibly accommodated within the compact joint space without interfering with the mechanical motions of joint elements or experiencing damage due to torsional or bending stress.

Accordingly, in one aspect, the invention pertains to an electromechanical joint for a robot. The joint includes multiple mechanical elements configured to provide relative motion therebetween and one or more cables including multiple insulated sub-cables in a unitary flat configuration for conveying power and signals. In various embodiments, the cable passes through the joint and is slack within the joint to accommodate the relative motion. Each of the sub-cables is insulated by an insulating divider made of, e.g., expanded Teflon and separable from all other sub-cables. In one embodiment, some the sub-cables are separated from the cable and electrically connected to one or more joint-associated components for conveying signals and power thereto without mechanically interfering with relative motion between mechanical elements of the joint.

The joint-associated component may be a sensor for detecting relative motion between two or more mechanical elements. In some embodiments, all of the sub-cables are physically accessible for removal from the cable and connection to a spatially separate location along one or more portions of the cable.

In a second aspect, the invention relates to a method of conveying power and signals in a robotic system that includes a joint having multiple mechanical elements configured for relative motion therebetween. Passing through the joint are one or more cables including multiple insulated sub-cables in a unitary flat configuration for conveying power and signals. The cable may be slack within the joint to accommodate the relative motion. Each of the sub-cables may be insulated and separable from all other sub-cables to accommodate a space within the joint. The method includes separating one or more sub-cables cable from other sub-cables by cutting along a thinned insulating divider therebetween without electrically affecting any of the sub-cables; making a mechanical and/or an electrical connection between the separated sub-cable and one or more joint-associated components for conveying signals and power thereto; conveying signals and power via the sub-cables; and causing relative motion between mechanical elements of the joint. In various embodiments, the cable and the connected sub-cables do not mechanically interfere with the relative motion.

In one embodiment, one or more joint-associated components are spatially separated from the joint. All of the sub-cables are physically accessible for removal from the cable and connection to a spatially separate location along one or more portions of the cable.

As used herein, the term "approximately" means ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1A:
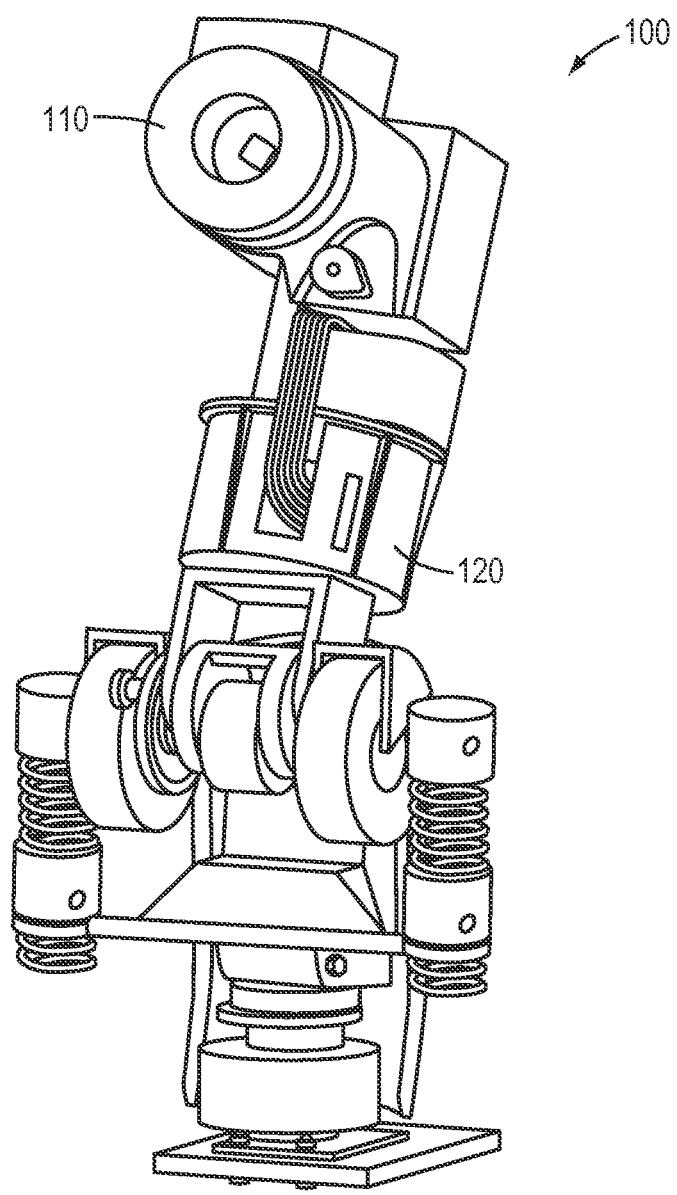
FIG. 1A is a perspective view of a robotic subsystem including a bend joint and a twist joint.
Figure 1B:
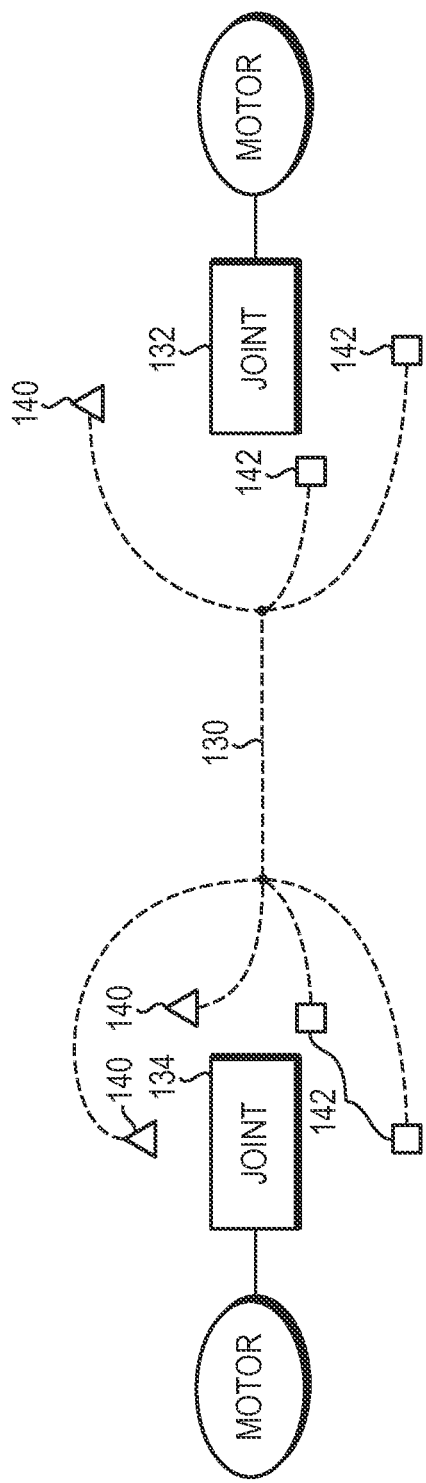
FIG. 1B depicts a laminated cable conveying power and/or signals to joints and joint-associated elements.

Refer first to FIG. 1A, which illustrates a portion 100 of a robotic system having multiple types of joints, in particular a bend joint 110 and a twist joint 120. Each joint may have different characteristics, freedom of movement (e.g., range of motion or degrees of freedom), and/or package space; therefore, cables passing through the joints generally require special designs adapted to the particular joint type. For example, a clock-spring system including a cable wound spirally in a space between two cylinders of the joint may be utilized to pass the cable through the joint with reduced cable length, system weight and cost; see, e.g., U.S. Ser. No. 13/446,585, filed on Apr. 13, 2012, the entire disclosure of which is hereby incorporated by reference. Referring to FIG. 1B, in various embodiments, the wired cable 130 distributes power to, for example, multiple motor-actuated joints 132, 134 (which are spatially distributed) and conveys digital and/or analog signals between joint-associated elements 140, 142 (e.g., electro-mechanical sensors 140 or control circuitry 142) that are placed in various locations in physical proximity to and/or connection with the joints. In one embodiment, the cable 130 transmits signals from a central controller 144 to the joints 132, 134, 136, 138 and the joint-associated elements 140, 142.

Figure 2A:
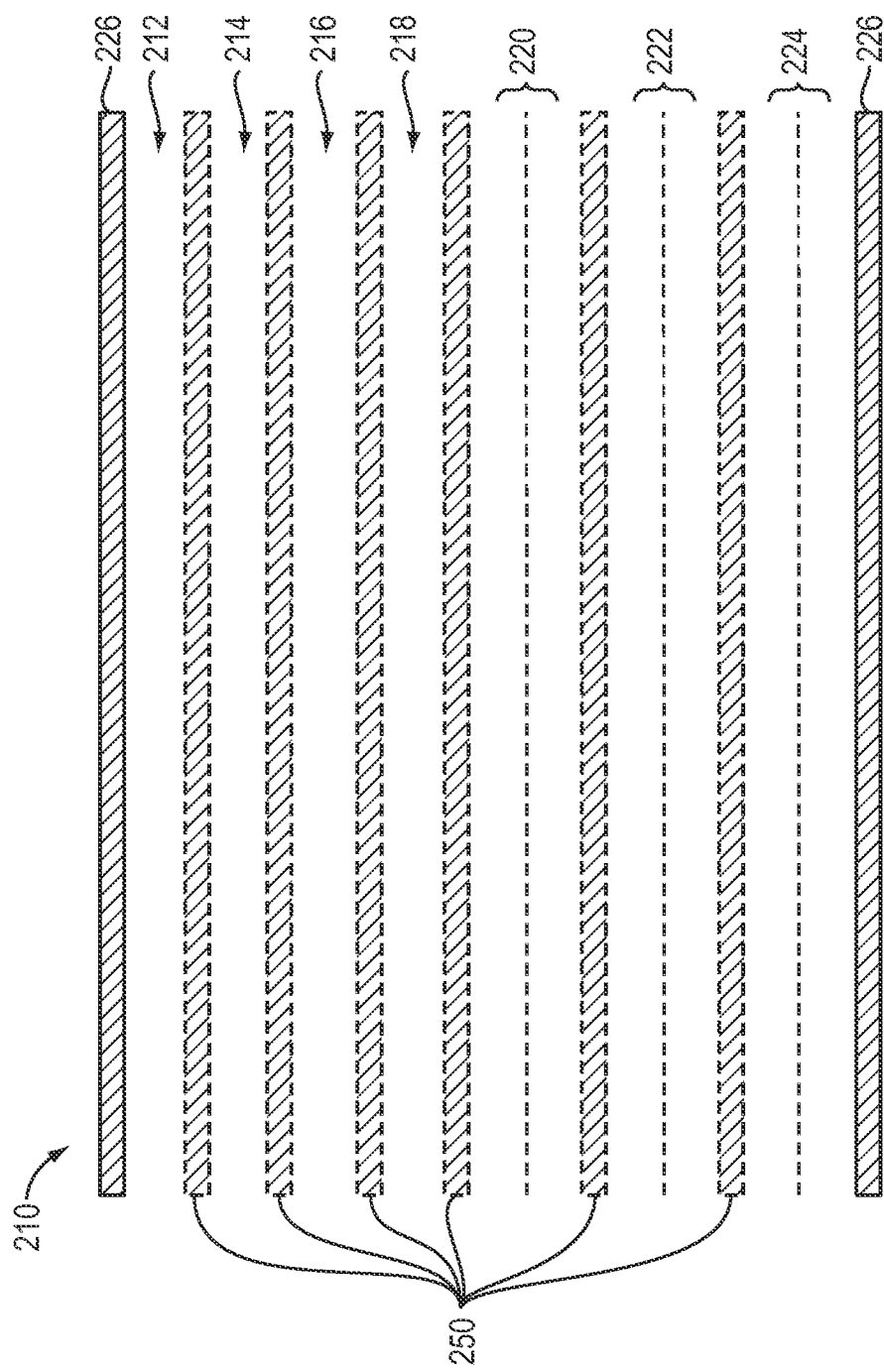
FIGS. 2A and 2B are a top view and a cross-sectional view of the laminated cable, respectively.
Figure 2B:
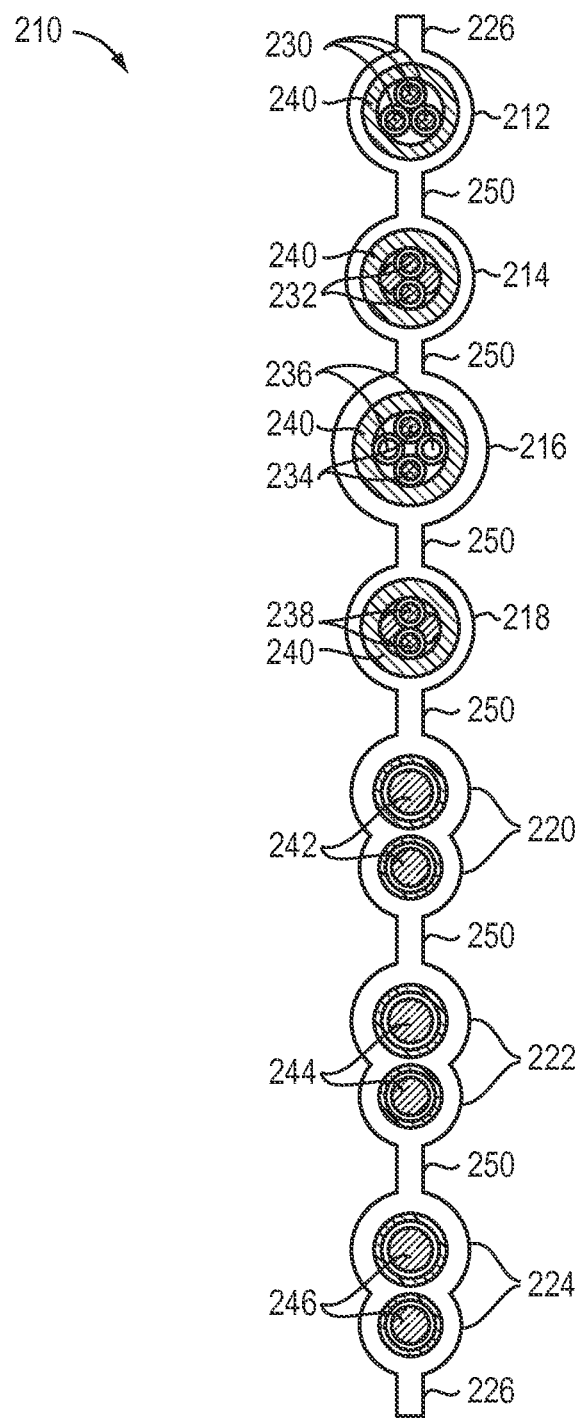

FIGS. 2A and 2B depict a top view and a cross-sectional view, respectively, of a unitary laminated cable 210 in accordance with embodiments of the present invention. The cable 210 is configured in a flat and thin shape to reduce space consumption, afford flexibility, and simplify cable routing in the joints. The flat and thin cable 210 may be inherently flexible and installed with enough slack to tolerate stresses applied thereto without experiencing significant mechanical wear. In various embodiments, the laminated cable 210 includes multiple sub-cables 212, 214, 216, 218, 220, 222, 224; each sub-cable conveys power or a signal. For example, sub-cables 212, 214, 216, 218 transmit a torque-sensing signal, a safety-control signal, a cat 5-e (i.e., Ethernet) signal, and a USB signal, respectively; sub-cables 220, 222, 224 are identical, each carrying system supply power and return power. As depicted in FIG. 2B, sub-cable 212 transmits the torque-sensing signals and may include three conductors 230; similarly, sub-cable 214 transmits the safety-control signals may include two conductors 232. Sub-cables 216, 218 that convey serial communications, such as USB and Ethernet signals, may include one or two twisted pairs of conductors 234, 236, 238 with a characteristic impedance of approximately 100Ω. Each conductor in the sub-cables is surrounded by an insulating material (e.g., expanded Teflon); the insulated conductors may be enclosed by a shielding conductive layer 240 for reducing electronic noise generated from other sub-cables and electromagnetic radiation that may interfere with other devices. The shielding conductive layer 240 is then covered by another layer of insulating material.

In one embodiment, the shielding conductive layer 240 is made of copper, aluminum, conducting polymer or other conductive materials. In some embodiments, finely stranded, plated copper conductors form a spiral sheath in two counter-wound layers. Sub-cables 220, 222, 224 that distribute power to the joints and/or joint-associated elements and carry power returned therefrom may include a pair of conductors 242, 244, 246 insulated but inseparable from one another; because these insulated conductors do not convey signals; they may or may not be shielded with a conductive layer. In some embodiments, an insulating divider 250 is employed between two sub-cables such that a part of each sub-cable can be easily "stripped off" from the other sub-cables; the insulating divider can be cut away without damaging the insulating material surrounding the conductive layers 240 of the sub-cables. The insulating divider 250 may be made of, for example, expanded Teflon, or other materials suitable for insulation but soft enough to be easily cut apart.

The separated sub-cables may be electronically connected to joint-associated elements (e.g., a torque sensor or a joint control electronics) located in various positions within or around the joints. Because the width of the separated sub-cables is smaller than that of the main laminated cable 210 and the length of the sub-cables that are stripped off from the main laminated cable 210 is adjustable, the separated sub-cables provide additional degrees of freedom within the compact space around the connected joint-associated elements that may have different geometries. The need for the entire cable to accommodate all electrical connections is thus avoided. The extra degrees of freedom provided by the sub-cables allow the cable 210 to pass through the joint and avoid mechanical interference therewith, without the need for extra cable length or intrinsic cable flexibility. Note that the present invention is not limited to any number or any spatial arrangement of the sub-cables of the main laminated cable; any number of sub-cables with any spatial arrangement suitable for conveying power and/or various signals are within the scope of the present invention. It should also be understood that any number and/or width of the insulating divider used to separate the sub-cables is within the scope of the present invention.

Figure 3:
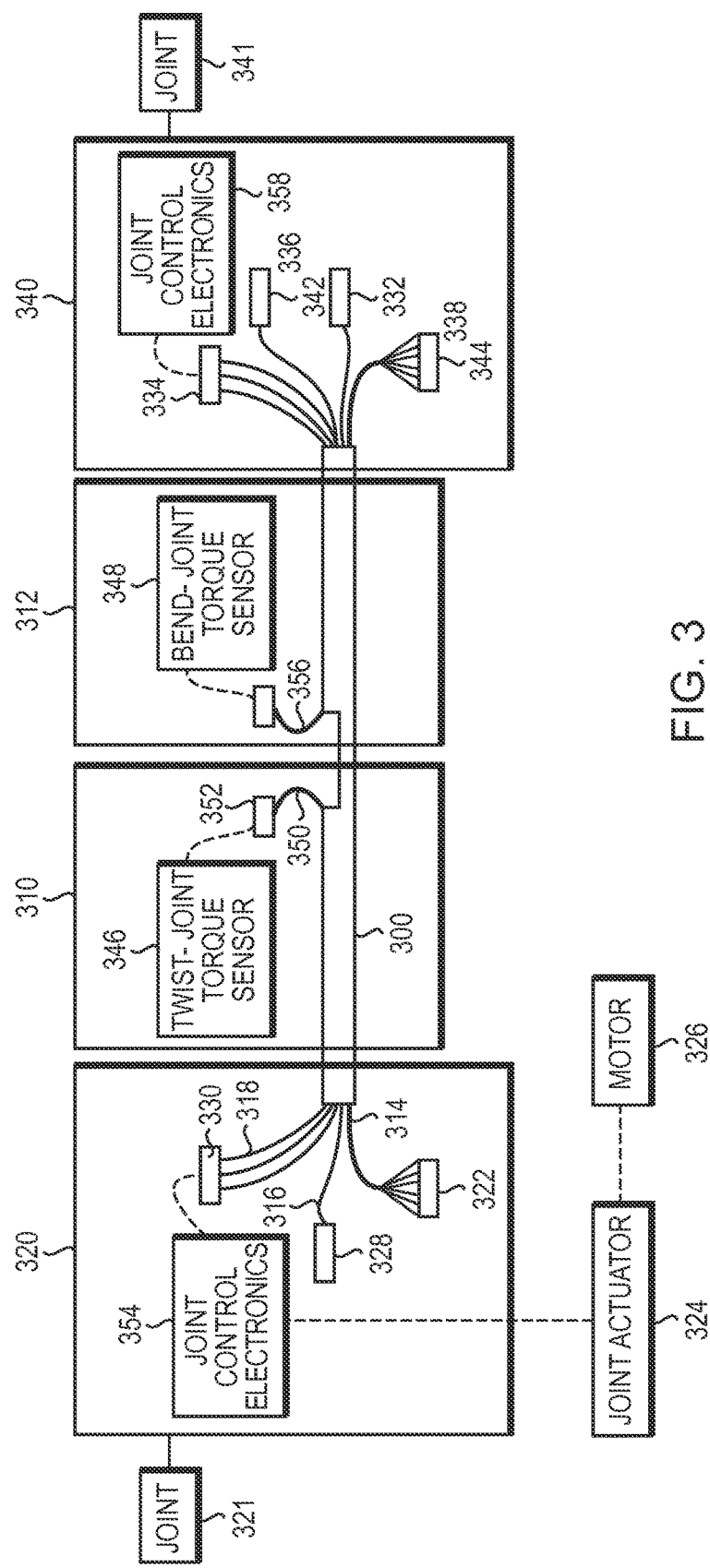
FIG. 3 depicts the laminated cable connected between two joints and a robotic component located outside the joints.

Referring to FIG. 3, a length of laminated cable 300 as depicted in FIGS. 2A and 2B is utilized to convey power and signals between two joints 310, 312. In one embodiment, the laminated cable 300 is split into three groups 314, 316, 318 of sub-cables within a link 320 between two joints 310, 321. Each group may include an integral jacket and/or an integral shield. The group 314 of the sub-cables includes three sub-cables that are connected to a power source (not shown) (i.e., sub-cables 220, 222, 224 in FIGS. 2A and 2B); the six power conductors within the three sub-cables terminate in a connector 322, which makes contact with respective conductors of the joint-associated elements for conveying power thereto. The second group 316 of the sub-cables may include, for example, one communication sub-cable (e.g., USB sub-cable) terminated at a connector 328 for conducting signals to a communication element associated with the link 320. The third group 318 may include sub-cables carrying torque-sensing, safety-control and Ethernet signals; this group of sub-cables may terminate in a connector 330 that can be plugged into a control circuit board (not shown) for controlling the movement of the joint 310. The three groups 314, 316, 318 of the sub-cables can be individually accommodated into the space defined by various mechanical constraints around the connected elements; this avoids over-bending or over-twisting the laminated cable 300 and/or interfering with the motion of the mechanical elements of the joint 310. Similarly, the unitary flat laminated cable 300 can be split into four groups 332, 334, 336, 338 of sub-cables within the link 340 between joints 312, 341. Sub-cables in groups 332, 334, for example, convey signals to sub-cables 316, 318, respectively, in the link 340. The sub-cable 336 is split off from the sub-cables 314 and power, for example, a local element (not shown) in the link 340 using a connector 342; the remaining power conductors in the group 338 of sub-cables provide power to a different element (not shown) associated with the link 340 through another connector 344. The laminated cable 300 may then pass through the joints 310, 312 and convey power and/or signals to the next joints using the approach as described above.

The laminated cable 300 may convey power and/or signals to robotic components that are located inside the joints 310, 312 and carry power and/or signals therefrom. With reference to FIG. 3, in some embodiments, the robotic components 346, 348 located inside the joints 310, 312 are a twist joint torque sensor and a bend joint torque sensor, respectively. The sub-cable 350 that carries torque-sensing signals is separated from the laminated cable 300 along the insulating divider 250 (on each side thereof unless the sub-cable 350 is at an edge of the cable 300) and connects to the twist joint torque sensor 346 via a connector 352; this provides signal communication between the twist joint torque sensor 346 and, for example, the joint control electronics 354 or the joint actuator 324 without requiring the entirety of the cable 300 to approach or connect to the torque sensor 346. Likewise, sub-cable 356 connects the bend joint torque sensor 348 to the joint control electronics 358 located adjacent to the sub-cable group 334. The separable sub-cables thus provide an approach to add or subtract power and/or signals from the laminated cable 300 at different locations that are associated with various robotic components.

The joint actuator 324 may be driven by the joint control electronics 354 local to the actuator 324 to minimize the number of conductors wired through the joints. For example, the joint control electronics 354 on a control board may drive two joints, each associated with a single brushless DC motor that requires ten conductors—three for the windings, five for position sensing, and two for thermal sensing. In one embodiment, four low-power Ethernet communication wires are substituted for the twenty motor actuator wires traversing the joints.

The separation mechanism, therefore, enables sub-cables to traverse flexible portions of the joint together while terminating in different locations. For example, if a pair of joints are stacked together, sub-cables between a pair of "clock spring" laminated cables may be separated to access sensors located between the joint pairs. Additionally, the separable sub-cables may terminate and transmit separate signals and power to circuit boards located in the links 320, 340 between joint pairs. Further, when conductors in the links 320, 340 do not terminate in a circuit board, the sub-cables may be easily mated with a section of the joint cable that connects to the next most-distal joint pair.

The bulk cable 300, for example, may be configured to accommodate joint motion via, e.g., a clock-spring deployment as described above while facilitating mechanically and spatially separate connections to the two torque sensors. The mechanical configuration of the bulk cable, in other words, may be adapted to accommodate a certain type of motion, and that configuration and movement accommodation are not disturbed by connections made by various ones of the sub-cables. Moreover, because all of the sub-cables are physically accessible throughout the length of the flat laminated cable 300—i.e., none are subsumed within a bundle or sheath—and may be disengaged therefrom for external connection at any arbitrary point along that length, the ability to establish electrical connections is not limited by the geometry of the cable or the ability of the bulk cable to pass close to the point of connection.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of conveying power and signals in a robot system comprising a joint including a plurality of mechanical elements configured for relative motion therebetween, and, passing through the joint, a cable comprising a plurality of insulated sub-cables in a unitary flat configuration for conveying power and signals, wherein (i) the cable is slack within the joint to accommodate the relative motion and (ii) each of the sub-cables is insulated and separable from all other sub-cables to accommodate a space within the joint, the method comprising: separating at least one sub-cable from other sub-cables by cutting along a thinned insulating divider therebetween without electrically affecting any of the sub-cables; making at least one of a mechanical or an electrical connection between the separated sub-cable and at least one joint-associated component for conveying signals and power thereto, the at least one of a mechanical or an electrical connection being made at an intermediate point along the cable spaced away from both ends of the cable; separating at least one second sub-cable, different from the at least one sub-cable, from other sub-cables by cutting along a thinned insulating divider therebetween without electrically affecting any of the sub-cables; making at least one of a mechanical or an electrical connection between the separated second sub-cable and at least one second joint-associated component for conveying signals and power thereto, the second joint-associated component being different from the joint-associated component; conveying signals and power via the sub-cables; and causing relative motion between mechanical elements of the joint, the cable and the connected sub-cables not mechanically interfering with the relative motion, wherein a separated length of the at least one sub-cable is different from a separated length of the at least one second sub-cable.

2. The method of claim 1, wherein the at least one joint-associated component is spatially separated from the joint.

3. The method of claim 1, wherein, along at least a portion of the cable, all of the sub-cables are physically accessible for removal from the cable to facilitate the separating step.

4. The method of claim 1, further comprising:
separating a second sub-cable from other sub-cables by cutting along a thinned insulating divider therebetween without electrically affecting any of the sub-cables; and
making at least one of a mechanical or an electrical connection between the separated second sub-cable and at least one joint-associated component for conveying signals and power thereto, the at least one of a mechanical or an electrical connection being made at a terminal location along the cable proximate an end of the cable.

5. The method of claim 1, wherein an entirety of the cable is slack within the joint.

6. The method of claim 1, wherein a total length of the at least one sub-cable is smaller than a total length of at least one other sub-cable of the cable.

7. The method of claim 1, wherein, along an entirety of the cable, all of the sub-cables are physically accessible for removal from the cable to facilitate the separating step.

8. The method of claim 1, wherein at least one sub-cable comprises two conductors therewithin, the two conductors being insulated from each other but inseparable from each other.

9. The method of claim 1, wherein a length of the cable passing through the joint remains constant during relative motion of the plurality of mechanical elements.

* * * * *